(12) United States Patent
Granlund et al.

(10) Patent No.: US 8,971,331 B2
(45) Date of Patent: Mar. 3, 2015

(54) SELECTION OF TRANSMISSION PARAMETERS FOR WIRELESS CONNECTION

(75) Inventors: Seppo Granlund, Helsinki (FI); Pasi Sarolahti, Helsinki (FI); Arto Karppanen, Helsinki (FI)

(73) Assignee: Nokia Corporation, Espoo (FI)

( * ) Notice: Subject to any disclaimer, the term of this patent is extended or adjusted under 35 U.S.C. 154(b) by 466 days.

(21) Appl. No.: 13/260,544

(22) PCT Filed: Mar. 24, 2009

(86) PCT No.: PCT/FI2009/050221
§ 371 (c)(1),
(2), (4) Date: Sep. 26, 2011

(87) PCT Pub. No.: WO2010/109054
PCT Pub. Date: Sep. 30, 2010

(65) Prior Publication Data
US 2012/0020248 A1    Jan. 26, 2012

(51) Int. Cl.
*H04W 28/18* (2009.01)
*H04W 52/26* (2009.01)
*H04W 52/50* (2009.01)
*H04W 88/06* (2009.01)

(52) U.S. Cl.
CPC ............ *H04W 28/18* (2013.01); *H04W 52/267* (2013.01); *H04W 52/50* (2013.01); *H04W 88/06* (2013.01)
USPC ....................................... 370/395.2

(58) Field of Classification Search
CPC ............ H04L 47/14; H04L 2012/5629; H04L 2012/5634; H04W 40/24; H04W 72/02; H04W 76/02; H04W 28/18; H04W 52/267; H04W 52/50; H04W 88/06
USPC ......... 370/229, 230, 231, 254, 310, 328, 338, 370/351, 389, 395.1, 395.2, 395.21; 455/403, 422.1, 435.1, 435.2, 450, 464
See application file for complete search history.

(56) References Cited

U.S. PATENT DOCUMENTS 7,099,689 B2    8/2006  Bahl et al.
2003/0189950 A1 * 10/2003  Spear et al. .................. 370/466
(Continued)

FOREIGN PATENT DOCUMENTS

WO    2005/060127 A1    6/2005
WO    2008/057869 A1    5/2008

OTHER PUBLICATIONS

Ebert et al., "Measurement and Simulation of the Energy Consumption of an WLAN Interface", Technical University Berlin, Telecommunication Networks Group, Technical Report TKN-02-010, Jun. 2002, 23 pages.

(Continued)

*Primary Examiner* — Obaidul Huq
(74) *Attorney, Agent, or Firm* — Squire Patton Boggs (US) LLP (57) ABSTRACT

A method, an apparatus, and a computer program for selecting one or more radio communication schemes for an end-to-end connection. Peers of the end-to-end connection negotiate (304), during establishment or operation of the end-to-end transport connection, about at least one transmission parameter of the end-to-end transport connection. Then, the peers select (306), amongst a plurality of wireless communication schemes supported by the wireless end-device, at least one wireless communication scheme capable of complying with the negotiated transmission parameters and, thus, available for use in the end-to-end transport connection.

16 Claims, 3 Drawing Sheets

(56) References Cited

U.S. PATENT DOCUMENTS

| | | | |
|---|---|---|---|
| 2005/0185653 A1* | 8/2005 | Ono et al. | 370/395.21 |
| 2005/0286418 A1* | 12/2005 | Rasanen | 370/230 |
| 2006/0010204 A1* | 1/2006 | Jalava et al. | 709/205 |
| 2006/0193295 A1 | 8/2006 | White et al. | |
| 2006/0286981 A1* | 12/2006 | Suumaki et al. | 455/435.1 |
| 2008/0232290 A1* | 9/2008 | Elzur et al. | 370/311 |
| 2009/0016245 A1 | 1/2009 | Karls | |
| 2009/0088108 A1 | 4/2009 | Granlund et al. | |
| 2009/0111506 A1* | 4/2009 | Laroia et al. | 455/550.1 |

OTHER PUBLICATIONS

Wischik, et al., "The Resource Pooling Principle", ACM SIGCOMM Computer Communication Review, vol. 38, No. 5, Oct. 2008, pp. 47-52.

International Search Report and Written Opinion received for corresponding Patent Cooperation Treaty Application No. PCT/FI2009/050221, dated Dec. 15, 2009, 12 pages.

Holma, et al., "WCDMA for UMTS", Radio Access for Third Generation Mobile Communications, John Wiley & Sons, Ltd., ISBN 0 471 72051 8, 2000.

Wireless Local Area Network (WLAN) (IEEE 802.11) and WiMAX (IEEE 802.16).

Hau, et al., "A 20mA Quiescent Current 40% PAE WCDMA HBT Power Amplifier Module with Reduced Current Consumption Under Backoff Power Operation", 2005 IEEE Radio Frequency Integrated Circuits Symposium, Jun. 2005.

Granlund, et al., "Multi Access Performance Measurements and Analysis", Part-1.

* cited by examiner

SELECTION OF TRANSMISSION PARAMETERS FOR WIRELESS CONNECTION

RELATED APPLICATION

This application was originally filed as PCT Application No. PCT/FI2009/050221 filed on Mar. 24, 2009, which is incorporated herein by reference in its entirety.

FIELD

The invention relates to the field of wireless telecommunications and, particularly, to selection of transmission parameters for an end-to-end connection including at least one wireless link.

BACKGROUND

Internet services in mobile devices are becoming very popular and there is a potential interest in new wireless peer-to-peer services between the mobile devices, e.g. presence and instant messaging, peer-to-peer file sharing, and multi-player games. Peer-to-peer transmission can be power-consuming due to potentially large amount of transferred data and signaling traffic. High power consumption in battery-powered devices reduces the operational duration between battery recharges.

Current mobile devices often include several radio interfaces capable of establishing an Internet connection, such as Wireless Local Area Network (WLAN), Worldwide Interoperability for Microwave Access (WiMAX), Wideband Code Division Multiple Access (WCDMA), and General Packet Radio Service (GPRS). Different radio technologies vary in the degree of radio coverage, supported data rates and delay of data transmission, and in the energy consumption during the data transfer. Typically a user prefers high-speed data transfer with minimal power consumption to maintain long battery lifetimes.

BRIEF DESCRIPTION

According to an aspect of the present invention, there is provided a method including: initiating, in a wireless end-device, establishment of an end-to-end transport connection with another end-device, wherein the end-to-end transport connection includes at least one wireless link; negotiating with the another end-device, during establishment or operation of the end-to-end transport connection, at least one transmission parameter of the end-to-end transport connection; selecting by the wireless end-device, amongst a plurality of wireless communication systems supported by the wireless end-device, at least one wireless communication system capable of complying with the negotiated transmission parameters available for use in the end-to-end transport connection, transferring data over the end-to-end transport connection including the selected at least one wireless communication system as the at least one wireless link, wherein the at least one wireless communication system comprises at least one radio interface, wherein the negotiated transmission parameters include a data rate of the end-to-end transport connection, and wherein the selection comprises selecting at least one wireless communication system capable of complying with the negotiated data rate; detecting an achievable data rate for each of the plurality of wireless communication systems supported by the wireless end-device; and using the detected achievable data rate in the negotiation about the transmission parameters.

According to another aspect of the present invention, there is provided an apparatus including: at least one processor; and at least one memory including computer program code, the at least one memory and the computer program code configured to, with the at least one processor, cause the apparatus to perform at least the following: initiate establishment of an end-to-end transport connection with another end-device, wherein the end-to-end transport connection includes at least one wireless link; negotiate with the another end-device, during establishment or operation of the end-to-end transport connection, at least one transmission parameter of the end-to-end transport connection; select, amongst a plurality of wireless communication systems supported by the apparatus, at least one wireless communication system capable of complying with the negotiated transmission parameters available for use in the end-to-end transport connection; and transfer data over the end-to-end transport connection including the selected at least one wireless communication system as the at least one wireless link, wherein the at least one wireless communication system comprises at least one radio interface, wherein the negotiated transmission parameters include a data rate of the end-to-end transport connection, and wherein the selection comprises selecting at least one wireless communication system capable of complying with the negotiated data rate; wherein the apparatus is further caused to: detect an achievable data rate for each of the plurality of wireless communication systems supported by the apparatus, and to use the detected achievable data rates in the negotiation about the transmission parameters.

According to yet another aspect of the present invention, there is provided a computer program product embodied on a computer readable distribution medium. The computer program, when executed by a processor, is configured to control the processor to perform a process, comprising: initiating, in a wireless end-device, establishment of an end-to-end transport connection with another end-device, wherein the end-to-end transport connection includes at least one wireless link; negotiating with the another end-device, during establishment or operation of the end-to-end transport connection, at least one transmission parameter of the end-to-end transport connection; selecting, amongst a plurality of wireless communication systems supported by the wireless end-device, at least one wireless communication system capable of complying with the negotiated transmission parameters available for use in the end-to-end transport connection; and transferring data over the end-to-end transport connection including the selected at least one wireless communication system as the at least one wireless link, wherein the at least one wireless communication system comprises at least one radio interface, wherein the negotiated transmission parameters include a data rate of the end-to-end transport connection, and wherein the selection comprises selecting at least one wireless communication system capable of complying with the negotiated data rate; detecting an achievable data rate for each of the plurality of wireless communication systems supported by the wireless end-device: and using the detected achievable data rate in the negotiation about the transmission parameters.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
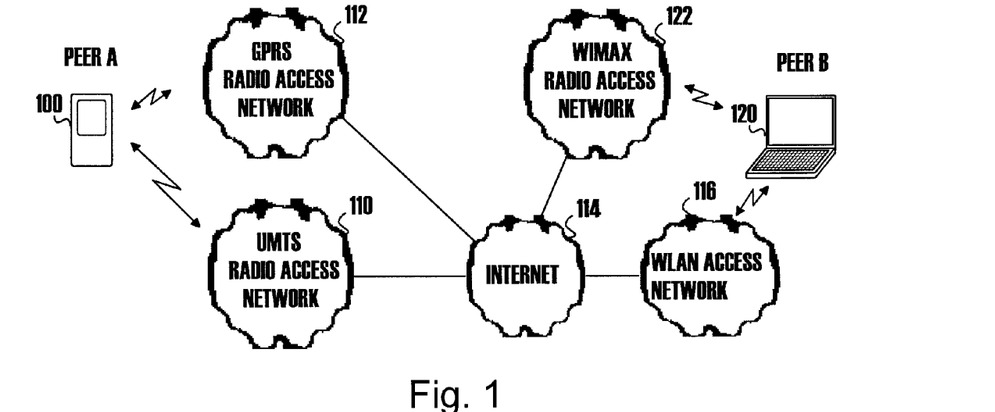
FIG. 1 illustrates a general structure of a communication environment to which embodiments of the invention may be applied.

FIG. 1 illustrates a general structure of a communication environment to which embodiments of the invention may be applied. Wireless devices 100 and 120 are both mobile or portable communication devices capable of establishing a communication connection over at least one wireless link. The wireless device 100 (peer A) is illustrated as a handheld mobile device, such as a cellular telephone or a PDA (portable digital assistant). It is illustrated as capable of (currently) communicating with cellular telecommunication systems based on a GPRS (General Packet Radio Service) communication protocol (over a GPRS radio access network 112) and a UMTS (Universal Mobile Telecommunication System) communication protocol (over a UMTS radio access network). As known in the art, the UMTS standard includes many releases including Wideband Code Division Multiple Access (W-CDMA), High-Speed Downlink/Uplink Packet Access (HSDPA/HSUPA), Long-Term Evolution (LTE) and LTE-Advanced.

The other wireless device 120 (peer B) is illustrated as a portable device, such as a laptop computer. It is illustrated as capable of (currently) communicating with wireless telecommunication systems based on a Wireless Local Area Network (WLAN) (IEEE 802.11) and WiMAX (IEEE 802.16). The WLAN connection is established through a serving access point of a WLAN access network 116, and a WiMAX connection is established through a serving base station of a WiMAX radio access network 122. The wireless devices 100, 120 may, however, be any other types of wireless communication devices, and they may be capable of establishing wireless communication links according to radio access schemes other than those illustrated in FIG. 1.

All the radio access networks 110, 112, 116, 122 in FIG. 1 are connected to the Internet 114 so as to enable communication connections all over the world. A peer-to-peer connection between the wireless devices 100, 120 may be routed through at least one radio access network serving each wireless device, e.g. UMTS and WLAN, and through the Internet 114. In an embodiment of the invention, one or both of the wireless devices 100, 120 support establishment of the peer-to-peer connection through multiple transmission paths.

Figure 2:
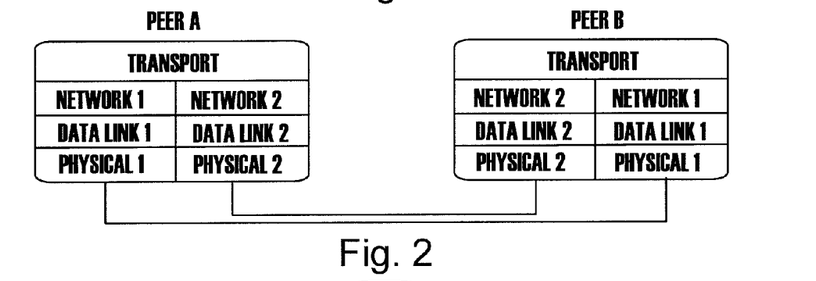
FIG. 2 illustrates protocol stacks of wireless devices according to embodiments of the invention.

FIG. 2 illustrates a protocol stack of the wireless devices 100, 120, wherein both devices have a transport layer protocol supporting multipath communication technique configured to establish, if necessary or feasible, a plurality of logical communication paths for a transport connection. An example of such a transport layer protocol is multipath TCP (Transmission Control Protocol). The multipath TCP is capable of adding and/or removing logical communication paths during the connection in order to improve the data rates, and improve overall quality of the connection. There may be a plurality of protocol stacks below the transport layer, each for a different logical communication path. The transport layer may be configured to control each lower stack to establish a logical communication path to the other peer, to schedule datagrams to the lower protocols and to aggregate datagrams received from the other peer through the lower layers.

Referring to FIGS. 1 and 2, the transport layer of peer A establishes a peer-to-peer connection with peer B, i.e. with the corresponding transport layer of peer B. The transport layer of peer A controls network layers 1 and 2 to establish an Internet protocol (IP) connection with the corresponding network layers 1 and 2 of peer B, respectively. Network layer 1 in peer A may be configured to establish an UMTS LTE connection and, therefore, it controls link and physical layers 1 of peer A to establish a radio resource connection with a serving LTE base station. Network layer 1 in peer B may be configured to establish a WLAN connection and, therefore, it controls link and physical layers 1 of peer B to establish the IP connection with peer A through a serving WLAN access point. Now, a first IP connection between peers A and B is established via the Internet 114 through the UMTS and WLAN radio access networks 110 and 116.

Network layer 2 in peer A may be configured to establish a GPRS connection and, therefore, it controls link and physical layers 2 of peer A to establish a connection with a serving GPRS node. Network layer 2 in peer B may be configured to establish a WiMAX connection and, therefore, it controls link and physical layers 2 of peer B to establish a radio resource connection with a serving WiMAX base station. Now, a second 1P connection between peers A and B is established via the Internet 114 through the GPRS and WiMAX radio access networks 112 and 122.

The transport layer of peer A schedules datagrams received from an application layer to both network layers 1 and 2. The network layers 1 and 2convey the datagrams over the respective IP connections to corresponding network layers 1 and 2 in peer B where the network layers 1 and 2 forward the datagrams to the transport layer of peer B which aggregates the datagrams and forwards the aggregated data to the application layer.

In the description above, both peers A and B support the multipath TCP which, as such, is known in the art. However, embodiments of the invention described below are equally applicable to a case where one of the peers supports the multipath TCP (or another corresponding multipath transport method) but the other peer supports only single path TCP (or the other single path transport method). The multipath TCP as a multipath transport protocol is merely an example of multipath transport protocol, and the multipath transport protocol may be another transport layer protocol supporting multipath communication. Alternatively, the multipath communication may be implemented on the network layer by using Host Identity Protocol (HIP), Site Multi-homing by IPv6 Intermediation (SHIM6), or another mobile IP extension supporting multipath communication.

Next, an embodiment of a method for establishing an end-to-end transport connection according to an embodiment of the invention is described with reference to FIG. 3. The method may be carried out in a wireless device either requesting establishment of the end-to-end connection from another peer or responding to an incoming request for the establishment of the end-to-end connection. The other peer may be another user device or a network server, and it may be connected to the Internet either in a wired or wireless manner. Basically, the end-to-end connection does not require even a network or the Internet between the peers and, therefore, the end-to-end connection may be a direct device-to-device connection The method starts in block 300. In block 302, the wireless device initiates establishment of the end-to-end transport connection. The initiation may be based on reception of a request from a higher layer, e.g. application layer, to establish the connection or reception of an incoming connection request from another wireless device. In block 304, the wireless device negotiates transmission parameters with the other peer. The negotiation may comprise agreement on a data rate to be used for the connection. Additionally, other parameters of the connection may be used, e.g. delay, maximum allowed bit or packet error rate. The negotiation is described in greater detail below. In general, the transmission parameters negotiated between the peers include higher layer transmission parameters, e.g. transport and/or network layer transmission parameters. Once the transmission parameters have been negotiated, the wireless device selects in block 306 one or more radio access schemes that are capable of complying with the negotiated transmission parameters. If a transport controller of the wireless device determines that more than one radio connection is needed to meet the negotiated transmission parameters, the transport controller may control establishment of multiple IP and radio connections. Once the IP and radio connections have been established, the establishment of the transport connection is completed in block 308, and data is transferred between the peers over the established transport connection in block 310.

Figure 3:
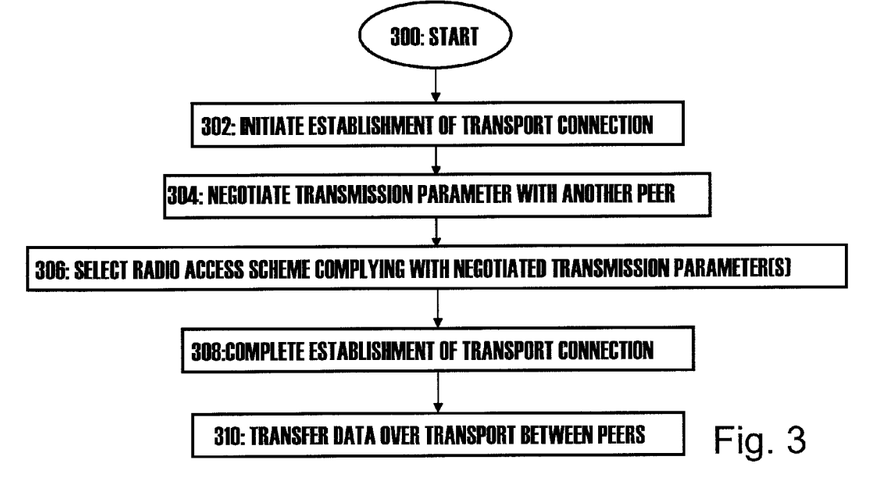
FIG. 3 illustrates a flow diagram of a process for establishing an end-to-end transport connection according to an embodiment of the invention.

The method of FIG. 3 may be carried out in the form of a computer process executed in a processor applicable to the wireless device. The computer process may comprise a source code embodied on a distribution medium readable by the processor. The source code may be stored in a memory unit of the wireless device, for example. The computer process may configure the processor to carry out the functionalities of at least the transport controller managing the end-to-end connection. The transport controller is thereby implemented by the processor with the access to the memory unit storing the source code and possible other parameters or information needed during the operation of the transport controller.

Figure 4:
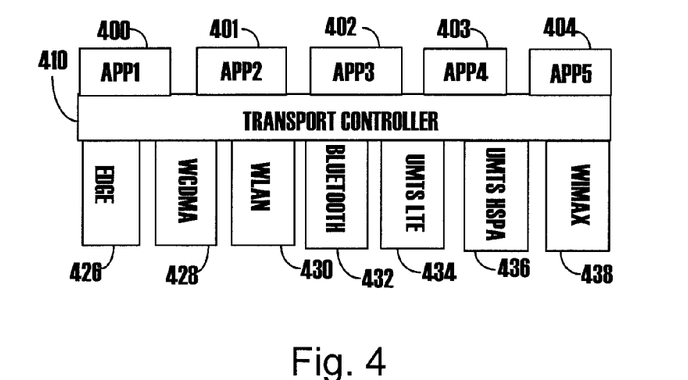
FIG. 4 illustrates a structure of a wireless device according to an embodiment of the invention.

FIG. 4 illustrates a logical structure of the wireless device, wherein a transport controller 410 resides between an application layer comprising applications 400, 401, 402, 403, 404 and radio interfaces 426 to 438. The transport controller 410 is configured to establish transport connections for the applications upon reception of a request from an application or from a radio interface. The applications may include voice call application, Internet TV or a video player application, gaming application, video conference application, email application, Internet browser application, etc. The radio interfaces include an EDGE (Enhanced Data rates for GPRS Evolution) interface 426, a UMTS W-CDMA interface 428, a WLAN interface 430, a Bluetooth interface 432, a UMTS LTE interface 434, a UMTS HSDPA interface 436, and a WiMAX interface 438. Bluetooth 432 or other short range radio connections may be utilized for end-to-end connections over the Internet if the Bluetooth connection is established with a routing device (a PC) routing the Bluetooth connection to another connection between the routing device and the Internet. It should be noted that the interfaces of FIG. 4 are logical interfaces, and the actual connections established through the different interfaces may actually use at least partly the same physical components, such as analog transceiver components or the same digital signal processor, to a feasible degree.

Each radio interface is configured to establish a radio connection according to the corresponding radio access scheme and radio protocol and to transfer data between the transport controller 410 and the corresponding radio access network. Additionally, each radio interface may communicate with the transport controller 410 so as to exchange control information, such as estimated data rates currently available to the radio link.

Figure 5A:
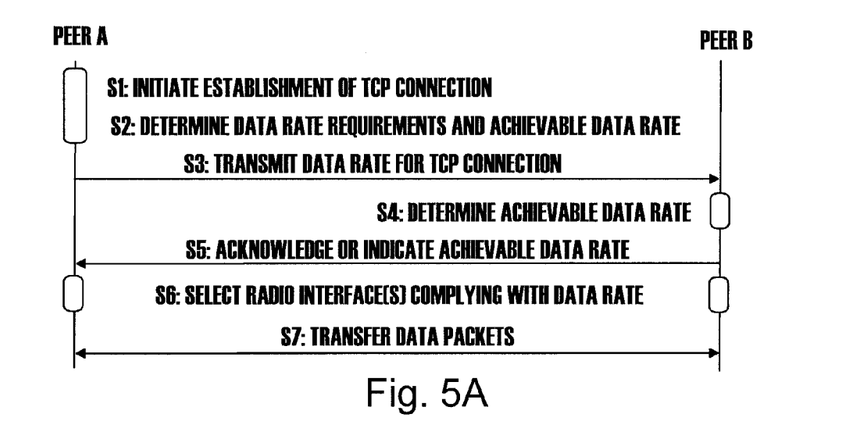
FIG. 5A is a signaling diagram illustrating negotiation about transmission parameters in connection with establishment of an end-to-end connection according to an embodiment of the invention.
Figure 5B:
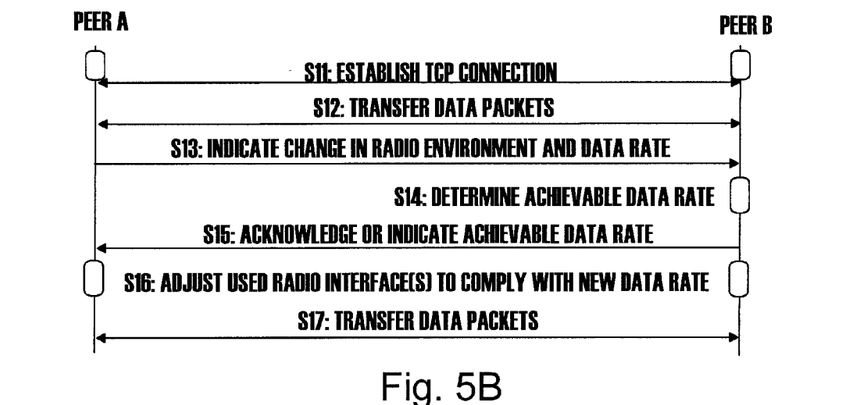
FIG. 5B is a signaling diagram illustrating negotiation about transmission parameters during the operation of the end-to-end connection according to an embodiment of the invention.

FIGS. 5A and 5B are signaling diagrams illustrating signaling procedures for configuring the end-to-end transport connection according to embodiments of the invention. In FIG. 5A, transmission parameters are negotiated between the end devices of the transport connection during the establishment of the transport connection, and an appropriate radio interface or radio interfaces are selected such that the transmission parameters can be supported. In FIG. 5B, transmission parameters are negotiated during the operation of the transport connection as a consequence of a changing radio environment, and radio interfaces in use are adjusted, if necessary.

Embodiments of the invention utilize flexible selection of radio links. In many cases the radio interface is a bottleneck of the end-to-end connection rather than the links in the fixed Internet. In the case of traditional, uncoordinated radio interface selection it is possible that the two peers make incompatible selections for their radio interfaces. For example, peer A might enable a high-speed WLAN or LTE interface in a situation where peer B has only GPRS radio available and is, thus, incapable of achieving high data rates. Now, peer A would use the high-speed connection for a low data rate end-to-end connection which results in suboptimal utilization of resources. It is also possible that the set of available radio links or the properties of radio links change during a communication session, for example because of mobility, and it would be useful to communicate the change of properties to the other end at any time during the connection to allow tuning for the optimal set of connection paths. Therefore, negotiation about transmission parameters, e.g. achievable data rates, between the peers according to an embodiment of the invention enables efficient utilization of radio links in both ends of the connection.

Referring to FIG. 5A, peer A initiates establishment of an end-to-end transport connection in S1. The transport connection is a TCP connection in this example. The establishment of the TCP connection may be initiated in response to a connection establishment request received in the transport controller from an application, e.g. a video conversation application or a gaming application. Initiation includes opening of a TCP connection to peer B by using a conventional TCP connection establishment handshake. At this stage, it is assumed that the TCP connection is established by using a default radio interface of peers A and B. If peers A and/or B already has a radio interface connection established, that radio interface may be used instead of a default radio interface to carry out the handshake.

In S2, the transport controller determines data rate requirements of the application requesting for the connection and an achievable data rate. The transport controller may first determine the data rate requirements of the application so as to determine radio interfaces that are potential candidates for the connection. For example, if the data rate required by the application exceeds the maximum data rate a GPRS connection can offer, the transport controller does not include a GPRS radio interface as a candidate for the connection. Then, the transport controller requests the candidate radio interfaces to estimate an achievable data rate for each candidate radio interface. The estimation may be carried out without establishing an actual radio connection. A channel state for each radio interface may be estimated from a received broadcast pilot signal, and the channel state may be used as a measure of an achievable data rate. Each radio interface may include a table that maps the channel states to achievable data rates, and the radio interface may check the table to acquire a data rate for a currently estimated channel state. Then, the radio interface may inform the transport controller of the achievable data rate. Alternatively, the radio interface may simply indicate the channel state (path loss, signal-to-noise ratio (SNR), signal-to-interference ratio (SIR), SINR or another parameter), and the transport controller may deduce the data rate. Additionally, an UMTS radio interface (WCDMA, HSPA, LTE) may utilize an uplink interference figure broadcasted by a UMTS base station in the estimation. The interference figure is a measure of a network load which affects the achievable data rates. The interference figure together with the channel estimate may be used to estimate the achievable data rate even more accurately by using a similar table mapping the combinations of interference figures and the channel estimates to achievable data rates. Naturally, it is possible to establish a radio connection with a serving base station with all the candidate radio interfaces in order to estimate the network load and other parameters affecting the data rates to provide a more accurate estimate of the data rate.

When the transport controller determines that a required data rate can be achieved with one or more of the candidate radio interfaces, the transport controller indicates the data rate of the TCP connection to peer B, for example, in a TCP SYN packet. The data rate indicated to peer B may be the minimum data rate required for the connection, a higher data rate achievable by peer A, or both. The corresponding transport controller in peer B receives the TCP SYN packet and extracts the data rate(s) requested for the connection. In S4, peer B carries out an operation similar to that of S2 and determines an achievable data rate for the connection by instructing the radio interfaces to estimate of achievable data rates. If peer B is able to meet the requested data rate by using one or more of the radio interfaces, it sends in S5 a data rate acknowledgment indicating to peer A that the requested data rate can be used. If peer B is not capable of meeting the requested data rate, it may be configured to send in S5 to peer A an indication of that, depending on the contents of the TCP SYN packet. If the TCP SYN packet includes only the minimum data rate required for the connection and if peer B cannot meet that, peer B may indicate incapability of fulfilling the requirements of the connection, and the transport controller of peer A may terminate the establishment of the connection. If the TCP SYN packet includes both the minimum data rate required for the connection and a higher data rate proposed by peer A and if peer B cannot meet the higher data rate but can meet the minimum data rate, peer B may indicate the highest achievable data rate back to peer A. If the TCP SYN packet includes only the data rate proposed by peer A and if peer B cannot comply with that, peer B may indicate the highest achievable data rate to peer A. Then, peer A may have to send another acknowledgment to peer B to indicate that the data rate is approved for the connection. The acknowledgment or indication of the data rate may be sent from peer B to peer A in a TCP SYN acknowledgment packet.

If the acknowledgment of indication of the achievable data rate received from peer B indicates that the minimum data rate is exceeded and the connection can be established, both peer A and B select in S6 one or more radio interfaces complying with the data rate. If a peer cannot comply with the negotiated data rate by using a single radio interface connection, the transport controller may instruct a plurality of radio interfaces that together can comply with the negotiated data rate to establish radio connections. If the radio connection(s) selected in S6 are different from that used as the default connection in signaling described above, the transport controller transfers the TCP connection from the default radio connection to the selected radio connection(s). In S7, TCP packets are exchanged between the peers over the established TCP connection.

Negotiation about the data rate of the connection enables efficient utilization of available radio resources. Neither peer will then over-dimension the utilized radio connections, which results in lower power consumption. Additionally, the capability of both peers to meet the required data rates is verified before the establishment of the connection. As mentioned above, the efficient utilization of the radio interfaces in a changing radio environment (due to mobility) may be ensured by negotiating the change in the achievable data rate during the TCP connection. This enables instant utilization of higher data rates, if the achievable data rate is improved, and better reduction in power consumption, if the achievable data rate degrades. Referring to FIG. 5B, the end-to-end TCP connection is established in S11 in the manner described above with reference to FIG. 5A, for example, and TCP packets are transferred in S12.

In S13, peer A detects a change in the achievable data rate. A degradation of achievable data rates may result in peer A not being able to meet the negotiated data rate even as a combination of multiple radio connections. This may be caused by poor or non-existent radio coverage with multiple radio interfaces and/or power constraints set by the transport controller so as to control power consumption in the wireless device of peer A. The power constraints will be described in greater detail later. On the other hand, improvement in the achievable data rate may result from movement to better coverage areas, for example. In S13, the transport controller of peer A indicates the change in the achievable data rate to peer B. Peer A may also communicate a possible new data rate for the connection. The signaling may be carried out through transport layer signaling. In S14, peer B receives the message and, if the message proposes a higher data rate, peer B may determine whether or not it can meet the newly proposed data rate by carrying out step S4 of FIG. 5A. If the message proposes a lower data rate, peer B may omit S14.

If peer B can meet the newly proposed data rate, peer B acknowledges the new data rate for the connection in S15. If peer A requests for a higher data rate but peer B cannot comply with the requested data rate, peer B may indicate in S15 to peer A the achievable data rate which is higher than the currently used data rate. Transport controllers of both peer A and B adjust radio interface(s) in S16 to comply with the newly negotiated data rate. S16 may comprise switching the utilization from one radio interface to another, adding a radio interface connection and/or terminating a radio interface connection, depending on the change in the negotiated data rate. If a transport controller deduces that the radio connections currently used provide the optimal performance in terms of data rate and power consumption, S16 may be omitted. In S17, TCP packets are transmitted with the newly negotiated data rate. Conventional transport layer TCP data rate adjustments based on detected network congestion may be applied on top of the described embodiments. The transport controller according to an embodiment of the invention takes into account the performance of the radio interfaces in the adjustment of the data rates.

Power consumption is an important factor in wireless devices, and power-efficient utilization of available radio resources is important in order to improve battery lifetimes. In order to enable power-efficient selection of radio interfaces used for the end-to-end connection, the transport controller may comprise a sub-routine that estimates the power consumption of each radio interface as a function of current radio environment and/or the data rate to be used. Alternatively, the functionality may be implemented in the radio interfaces, and the transport controller may instruct the (candidate) radio interfaces to estimate the power consumption. An example of estimation of power consumption is now described by using UMTS WCDMA as an example, but the process is analogous to other radio interfaces.

The UMTS base station broadcasts the uplink interference figure $I_{up}$ as described above, and the path loss L is estimated by the wireless device from the pilot signal received from the base station. A nominal value of uplink SIR $SIR_{up}$ needed for a desired data rate could be provided as a terminal internal parameter in the table described above. In the following, $P_{received\_up}$ denotes the power that is received in the base station, and $P_{received\_down}$ denotes the power that is received by the wireless device. For transmitted powers, the corresponding notations are $P_{trans\_up}$ and $P_{trans\_down}$. $SIR_{up}$ may be calculated as the ratio between $P_{received\_up}$ and $I_{up}$, and $P_{received\_up}$ may be calculated by the ratio between $P_{trans\_up}$ and L. Thus, we get the following equation:

$$P_{trans\_up} = SIR_{up} L I_{up} \quad (1)$$

The battery power consumed by a modem processor of the wireless device can be estimated as a linear function of the data rate r as:

$$P_{Modem} = \alpha r + \beta \quad (2)$$

The values of the modem power consumption for different data rates may be measured beforehand and stored as table values in the wireless device. Additionally, the achievable uplink data rate r may be expressed as a function of the $SIR_{up}$ as $r = d(SIR_{up})$, and the battery power consumed by a power amplifier may be expressed as a function of uplink transmission power: $P_{Power\_amplifier} = s(P_{trans\_up})$. Functions d and s may be measured beforehand and stored as table values in the wireless device, so that they can be used in determination of achievable data rate from the measured SIR and the transmission power from the measured SIR, path loss and interference figure. Now, we get an estimate for power consumption of UMTS WCDMA radio interface:

$$P_{WNI}(r, I_{up}) = P_{Modem}(r) + P_{Power\_Amplifier} = \alpha r + \beta + \sigma(P_{trans\_up}) = \alpha \delta(SIR_{up}) + \beta + \sigma(SIR_{up} L I_{up}) \quad (3)$$

From Equation (3), a metric indicating consumed energy as a function of data rate (joules per bit) is obtained as:

$$P_{Joules\_per\_bit}(r, I_{up}) = \frac{P_{WNI}(r, I_{up})}{r} \quad (4)$$

Values of $P_{Joules\_per\_bit}$ for different data rates and interference figures may be stored as table values in the wireless device. Similar methods can be used to derive estimates for the joules per bit figures for the downlink of WCDMA and for the other radio interfaces. The actual functions may differ due to a lack of interference figure, for example, but in such cases the functions may be calculated from the SIR or corresponding estimates. The point is that the wireless device is capable of estimating the radio environment according to a given metric to estimate achievable data rates and, then, the wireless device may estimate the power consumption from table values linking the achievable data rates to power consumption. The table values are stored beforehand in the wireless device during the manufacturing or testing phase.

The utilization of a single radio interface when compared with utilization of multiple radio interfaces in parallel may have a remarkable effect on the battery energy consumption. The situation may also depend on the status and load of each specific radio access network. In the following, energy estimates for utilization of parallel radio interfaces is derived by applying a linear prediction method. Let us assume that the wireless device is downloading a file of size K bits by using HSDPA and WLAN radios in parallel. Then assume that the battery power for both cases is estimated by using the linear formula $$P(r) = \alpha_x r + \beta_x \quad (5)$$

where $a_x$ and $\beta_x$ are constants and r is the data rate (Mbps). Let us further denote data rates for WLAN and HSDPA as $r_{WLAN}$ and $r_{HSDPA}$, respectively. Values describing the linear function of P(r) for each radio interface may be measured beforehand and stored in the wireless device. The duration of downloading the file is:

$$D = \frac{K}{r_{HSDPA} + r_{WLAN}} \quad (6)$$

The total energy that the wireless network interface (in the device) consumes during the download can be estimated as follows:

$$E_{tot} = \frac{K}{r_{HSDPA} + r_{WLAN}} \left( \frac{\alpha_{HSDPA} r_{HSDPA} + \beta_{HSDPA} +}{\alpha_{WLAN} r_{WLAN} + \beta_{WLAN}} \right) = \quad (7)$$

$$= K \left( \frac{\alpha_{HSDPA} r_{HSDPA} + \alpha_{WLAN} r_{WLAN}}{r_{HSDPA} + r_{WLAN}} + \frac{\beta_{HSDPA} + \beta_{WLAN}}{r_{HSDPA} + r_{WLAN}} \right)$$

$$\text{Joules\_per\_bit} = \frac{E_{tot}}{K} \quad (8)$$

$$= \frac{\alpha_{HSDPA} r_{HSDPA} + \alpha_{WLAN} r_{WLAN}}{r_{HSDPA} + r_{WLAN}} + \frac{\beta_{HSDPA} + \beta_{WLAN}}{r_{HSDPA} + r_{WLAN}}$$

Let us consider some scenarios. In a first scenario, high data rates are achievable in both peer A and B by using a multiradio transport connection. Let us assume that peer A sends a large file of the length of K bits to a device of peer B. In addition, assume that peer A is capable of accessing a UMTS LTE radio access network, and peer B is in the coverage area of a UMTS HSDPA and WLAN. Let us assume that peer A is able to achieve a high uplink data rate of 8 Mbits/s by using the LTE radio interface. It is typical of wireless transmission that high energy-efficiency and a low joules-per-bit figure can be achieved with high data rates rather than low data rates. In this scenario, Peer A can achieve small energy consumption by using a high uplink data rate of LTE (8 Mbits/s), if Peer B can receive with a similar data rate. Peer B can achieve such a data rate by downloading the file in parallel with HSDPA (2 Mbits/s) and WLAN (6 Mbits/s). The energy consumption of peer B device can be estimated by using formulas like (7) and (8). In this case, peer A signals a message to peer B to indicate a data rate of 8 Mbits/s, and peer B uses this information to start using two interfaces for data reception, provided that peer B is capable of meeting the data rate.

In a second scenario, peers A and B are located within coverage areas of systems providing similar data rates. Peer A may be in the coverage area of WLAN, and peer B may be in the coverage area of WCDMA HSDPA. In this case, it is feasible to select WLAN upload for peer A and HSDPA download for peer B (instead of slower WCDMA). The efficiency of packet data transfer in both peers A and B is high when the data rate capabilities of peer A and Peer B radio interfaces are approximately the same.

In a third scenario, there is only a low data rate available at one end of the connection. It is possible that peer B has only GPRS connectivity available and can therefore receive data at a low rate. Peer A might have a variety of radio interfaces (WLAN, HSDPA, GPRS) in use but, since peer B can only receive at a low rate, peer A evaluates which one(s) of the three radio interfaces is the most energy-optimal in this situation. Therefore, it would be useful for peer B to signal to peer A that it is able to receive only at a low rate, so as to help peer A know that the use of high-speed radios is unnecessary.

Figure 6:
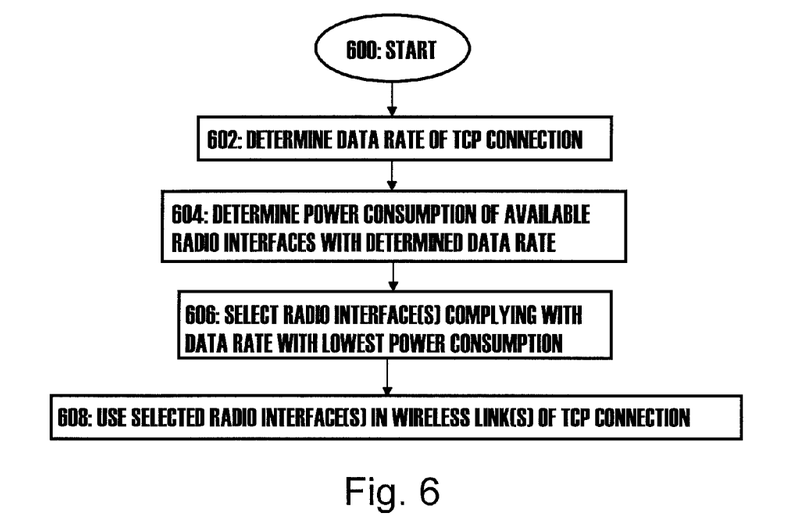
FIG. 6 is a flow diagram illustrating a process for determining power-efficient radio links for the end-to-end connection.
Figure 7:
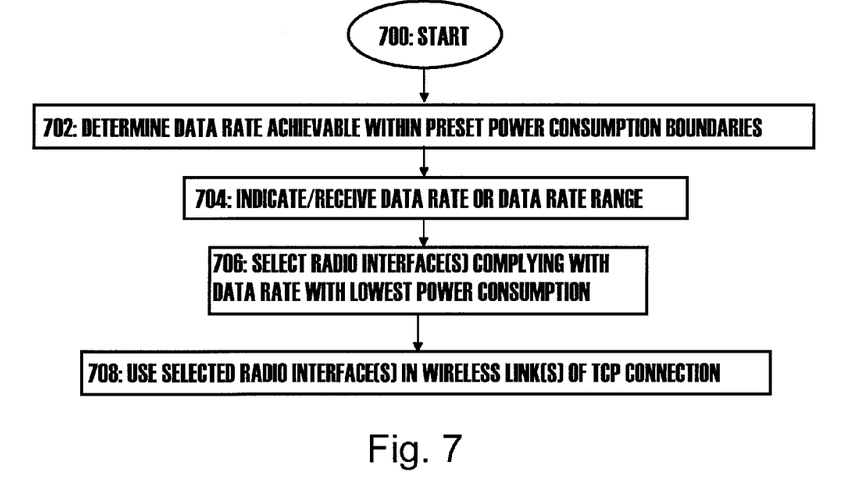
FIG. 7 is a flow diagram illustrating another process for determining power-efficient radio links for the end-to-end connection.

FIGS. 6 and 7 illustrate two embodiments of the invention where the power consumption of different radio interfaces is taken into account in the selection of radio interfaces for the end-to-end connection between the Peers A and B. The processes of FIGS. 6 and 7 may be carried out in the wireless device of FIG. 4, i.e. in the wireless device of Peer A and/or B. The processes may be embodied as computer programs executed by a processor. The embodiments of FIGS. 6 and 7 may be applied to both embodiments of FIGS. 5A and 5B. In the embodiment of FIG. 6, data rate is prioritized over power consumption, and the embodiment of FIG. 7 prioritizes power consumption over the maximum data rate.

Referring to FIG. 6, the process starts in block 600. In block 602, the transport controller determines the data rate of the TCP connection. Block 602 may include the operation of the wireless device (either peer A or B) in S2 to S5 in FIG. 5A or S13 to S15 in FIG. 5B. In other words, the data rate for the TCP connection is negotiated with the other peer in block 602. In block 604, the transport controller determines the power consumption of different means for complying with the negotiated data rate. The different means include candidate radio interface(s) or combination(s) of radio interfaces that can comply with the negotiated data rate. As mentioned previously, a higher data rate connection typically provides lower energy per bit figures, so usually a single high rate connection prevails multiple low rate connections. As a general rule, the transport controller may omit the combination of a plurality of radio interfaces, if the data rate can be complied with any single radio interface. This simplifies the complexity of block 604. The power consumption with respect to the achievable data rate of the candidate radio interfaces may be estimated as described above with respect to Equations (1) to (8). In block 606, the transport controller selects the candidate radio interface(s) that provide the lowest power consumption, i.e. the lowest value for the energy consumption versus the data rate. In block 608, the selected radio interface(s) are used for the TCP connection as the wireless link(s) for the wireless device.

In one embodiment of FIG. 6, peers A and B negotiate the data rate and select the radio interfaces independently such that energy-efficiency is optimized for both peers independently. In another embodiment of FIG. 6, the peers may also exchange one or more of the most optimal values of energy consumption versus data rate for a given set of data rates. The peers may exchange values for both uplink and downlink separately. Then, the peer receiving these values may compare the data rates (an energy consumption values) to corresponding values of its candidate radio interfaces so as to determine the data rate that provides the most optimal combination of energy consumption versus data rate, e.g. the lowest combined joules per bit value.

FIG. 7 illustrates an embodiment where the transport controller prioritizes power consumption over data rate. The transport controller may set predefined power consumption boundaries for the transport connection and determine data rates achievable within the preset power consumption (joules per bit) boundaries. Referring to FIG. 7, the process starts in block 700. In block 702, the transport controller determines the data rate or data rate range within preset power consumption boundaries. The power consumption boundaries may depend on the currently available radio interface(s) and their connection quality or qualities. Upon establishment of the TCP connection, the transport controller may determine availability of the radio interfaces by requesting the radio interfaces to check for availability to establish a radio link and to estimate connection quality or achievable data rate. On the basis of available radio connections and achievable data rates, the transport controller sets the power consumption boundaries. The detection of availability and quality of connections enables reasonable setting of the boundaries such that the boundaries are not too tight if, for example, the availability and connection quality is poor. The transport controller of peer A may calculate an interval of energy-feasible data rates on the basis of the available radio interfaces and Equation (4) and/or (8) as:

$$I_A = [r_{min}^A, r_{max}^A] \tag{9}$$

Similarly, the transport controller of peer B calculates the corresponding interval in the similar manner:

$$I_B = [r_{min}^B, r_{max}^B] \tag{10}$$

If either transport controller has information on fixed data rates affecting the achievable data rate in the network between the peers of the end-to-end connection, the achievable data rate interval in the bottleneck of the network between the peers may also be calculated:

$$I_{net} = [r_{min}^{net}, r_{max}^{net}] \tag{11}$$

Then, an overlapping data rate interval between at least $I_A$ and $I_B$ (and possibly $I_{net}$) is calculated. For example, peer A having $I_A$ and $I_{net}$ calculates an intersection of $I_A$ and $I_{net}$ and signals the resulting interval to Peer B (in S3 or S13 in FIGS. 5A and 5B). Then, peer B calculates an intersection between $I_B$ and the received data rate interval, and thus obtains an interval of available data rates as $$I_{tot} = [r_{min}, r_{max}] \quad (12)$$

Now, Peer B may select a data rate for the connection from $I_{tot}$ according to a predetermined criterion, e.g. an average (or median) of $I_{tot}$, the data rate providing the lowest energy consumption per data rate. Peer B then signals the selected data rate to peer A. The negotiation of the data rate is carried out on block 704. The data rate may be kept fixed during the connection, or it may be adjusted according to FIG. 5B. In block 706, the transport controllers of peer A and B select the radio interface(s) complying with the data rate with the lowest power consumption, i.e. the radio interfaces providing the most optimal energy consumption versus data rate for the negotiated data rate. In block 708, the selected radio interface(s) are used in the wireless link(s) of the TCP connection.

Above, the embodiments of the invention have been described in a context where both peers are wireless multiradio terminals capable of smart selection of radio interfaces. However, embodiments of the invention may also be applied to a case where one end-device of the connection is connected to the Internet in a wired/fixed manner, e.g. a server. In such a case, the wireless device establishing the end-to-end transport connection and selecting the appropriate radio interface(s) may also negotiate about the transmission parameters with the server. The server may provide the wireless device with an estimate of available uplink and/or downlink data rates on the basis of load of the server, for example. The server may indicate the estimate of the achievable data rate to the wireless device which, then, may select the most (energy) optimal radio interface(s) to meet the data rate. In many ways, the operation in FIGS. 5A to 6 is very similar to that in the case where the other end is a server.

As mentioned above, the processes or methods described in FIGS. 3, 6, and 7 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to not only cellular or mobile telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   initiating, in a wireless end-device, establishment of an end-to-end transport connection with another end-device, wherein the end-to-end transport connection includes at least one wireless link;
   negotiating with the another end-device, during establishment or operation of the end-to-end transport connection, at least one transmission parameter of the end-to-end transport connection;
   selecting by the wireless end-device, amongst a plurality of wireless communication systems supported by the wireless end-device, at least one wireless communication system capable of complying with the negotiated transmission parameters available for use in the end-to-end transport connection;
   transferring data over the end-to-end transport connection including the selected at least one wireless communication system as the at least one wireless link,
   wherein the at least one wireless communication system comprises at least one radio interface, wherein the negotiated transmission parameters include a data rate of the end-to-end transport connection, and wherein the selection comprises selecting at least one wireless communication system capable of complying with the negotiated data rate;
   detecting an achievable data rate for each of the plurality of wireless communication systems supported by the wireless end-device; and
   using the detected achievable data rate in the negotiation about the transmission parameters.

2. The method of claim 1, further comprising: estimating power consumption with respect to the data rate for each of the plurality of wireless communication systems supported by the wireless end-device; using the estimated power consumption in the negotiation about the transmission parameters or in the selection of the at least one wireless communication system.

3. The method of claim 2, further comprising:
   negotiating a data rate for the end-to-end transport connection on the basis of data rate requirements of an application associated with the end- to-end transport connection and data rates achievable by the end-devices; and
   selecting, by the wireless end-device, the at least one wireless communication system capable of complying with the negotiated data rate with the lowest energy consumption.

4. The method of claim 2, further comprising:
   determining a data rate or a data rate range achievable with one or more of the supported wireless communication systems and within preset power consumption boundaries; and
   using the determined data rate or data rate range in the negotiation about the transmission parameters.

5. The method of claim 2, wherein the selection comprises selecting a plurality of wireless communication systems that together are capable of complying with the negotiated transmission parameters.

6. The method of claim 5, wherein the end-to-end transport connection is a transport layer connection according to a transport protocol supporting a multipath communication technique configured to establish a plurality of logical communication paths for the end-to-end transport connection.

7. The method of claim 6, wherein the plurality of logical communication paths utilize different wireless communication systems.

8. An apparatus, comprising:
   at least one processor; and
   at least one memory including computer program code,
   the at least one memory and the computer program code configured to, with the at least one processor, cause the apparatus to perform at least the following:

initiate establishment of an end-to-end transport connection with another end-device, wherein the end-to-end transport connection includes at least one wireless link;

negotiate with the another end-device, during establishment or operation of the end-to-end transport connection, at least one transmission parameter of the end-to-end transport connection;

select, amongst a plurality of wireless communication systems supported by the apparatus, at least one wireless communication system capable of complying with the negotiated transmission parameters available for use in the end-to-end transport connection; and transfer data over the end-to-end transport connection including the selected at least one wireless communication system as the at least one wireless link, wherein the at least one wireless communication system comprises at least one radio interface, wherein the negotiated transmission parameters include a data rate of the end-to-end transport connection, and wherein the selection comprises selecting at least one wireless communication system capable of complying with the negotiated data rate;

wherein the apparatus is further caused to:

detect an achievable data rate for each of the plurality of wireless communication systems supported by the apparatus, and to use the detected achievable data rates in the negotiation about the transmission parameters.

9. The apparatus of claim 8, wherein the apparatus is further caused to:

estimate power consumption with respect to the data rate for each of the plurality of wireless communication systems supported by the wireless communication device, and use the estimated power consumption in the negotiation about the transmission parameters or in the selection of the at least one wireless communication system.

10. The apparatus of claim 9, wherein the apparatus is further caused to:

negotiate a data rate for the end-to-end transport connection on the basis of data rate requirements of an application associated with the end- to-end transport connection and data rates achievable by the end-devices; and select the at least one wireless communication system capable of complying with the negotiated data rate with the lowest energy consumption.

11. The apparatus of claim 9, wherein the apparatus is further caused to:

determine a data rate or a data rate range achievable with one or more of the supported wireless communication systems and within preset power consumption boundaries; and use the determined data rate or data rate range in the negotiation about the transmission parameters.

12. The apparatus of claim 9, wherein the selection comprises selecting a plurality of wireless communication systems that together are capable of complying with the negotiated transmission parameters.

13. The apparatus of claim 12, wherein the end-to-end transport connection is a transport layer connection according to a transport protocol supporting a multipath communication technique configured to establish a plurality of logical communication paths for the end-to-end transport connection.

14. The apparatus of claim 13, wherein the plurality of logical communication paths utilize different wireless communication systems.

15. A wireless communication device comprising an apparatus according to claim 14.

16. A computer program, embodied on a non-transitory computer-readable medium, the computer program, when executed by a processor, is configured to control the processor to perform a process, comprising:

initiating, in a wireless end-device, establishment of an end-to-end transport connection with another end-device, wherein the end-to-end transport connection includes at least one wireless link;

negotiating with the another end-device, during establishment or operation of the end-to-end transport connection, at least one transmission parameter of the end-to-end transport connection;

selecting, amongst a plurality of wireless communication systems supported by the wireless end-device, at least one wireless communication system capable of complying with the negotiated transmission parameters available for use in the end-to-end transport connection; and transferring data over the end-to-end transport connection including the selected at least one wireless communication system as the at least one wireless link, wherein the at least one wireless communication system comprises at least one radio interface, wherein the negotiated transmission parameters include a data rate of the end-to-end transport connection, and wherein the selection comprises selecting at least one wireless communication system capable of complying with the negotiated data rate;

detecting an achievable data rate for each of the plurality of wireless communication systems supported by the wireless end-device; and using the detected achievable data rate in the negotiation about the transmission parameters.

\* \* \* \* \*